US007003515B1

(12) United States Patent
Glaser et al.

(10) Patent No.: US 7,003,515 B1
(45) Date of Patent: Feb. 21, 2006

(54) CONSUMER ITEM MATCHING METHOD AND SYSTEM

(75) Inventors: William T. Glaser, San Francisco, CA (US); Timothy B. Westergren, Menlo Park, CA (US); Jeffrey P. Stearns, Berkeley, CA (US); Jonathan M. Kraft, Los Angeles, CA (US)

(73) Assignee: Pandora Media, Inc., Oakland, CA (US)

( * ) Notice: Subject to any disclaimer, the term of this patent is extended or adjusted under 35 U.S.C. 154(b) by 358 days.

(21) Appl. No.: 10/150,876

(22) Filed: May 16, 2002

Related U.S. Application Data

(60) Provisional application No. 60/291,821, filed on May 16, 2001.

(51) Int. Cl.
G06F 17/30 (2006.01)
(52) U.S. Cl. ................................ 707/5; 707/6; 707/104.1
(58) Field of Classification Search .................... 707/5, 707/6, 104.1
See application file for complete search history.

(56) References Cited

U.S. PATENT DOCUMENTS

| | | | |
|---|---|---|---|
| 4,191,472 A | 3/1980 | Mason | 356/243.4 |
| 4,775,935 A | 10/1988 | Yourick | 715/811 |
| 5,041,972 A | 8/1991 | Frost | 705/10 |
| 5,124,911 A | 6/1992 | Sack | 705/10 |
| 5,210,820 A * | 5/1993 | Kenyon | 704/200 |
| 5,237,157 A | 8/1993 | Kaplan | 235/325 |
| 5,250,745 A | 10/1993 | Tsumura | 434/307 A |
| 5,278,751 A | 1/1994 | Adiano et al. | 705/10 |
| 5,291,395 A | 3/1994 | Abecassis | 705/27 |
| 5,410,344 A | 4/1995 | Graves et al. | 725/46 |
| 5,469,206 A | 11/1995 | Strubbe et al. | 725/60 |
| 5,483,278 A | 1/1996 | Strubbe et al. | 725/61 |
| 5,486,645 A | 1/1996 | Suh et al. | 84/610 |
| 5,534,911 A | 7/1996 | Levitan | 725/46 |
| 5,541,638 A | 7/1996 | Story | 725/116 |
| 5,550,746 A | 8/1996 | Jacobs | 700/231 |
| 5,616,876 A | 4/1997 | Cluts | 84/609 |
| 5,634,021 A * | 5/1997 | Rosenberg et al. | 715/841 |
| 5,634,051 A | 5/1997 | Thomson | 707/5 |
| 5,634,101 A | 5/1997 | Blau | 705/10 |
| 5,675,784 A | 10/1997 | Maxwell et al. | 707/100 |
| 5,719,344 A * | 2/1998 | Pawate | 84/609 |

(Continued)

OTHER PUBLICATIONS

Al-Hawamdeh et al. "Compound Document Processing system" Sep. 1991, Processings.*

(Continued)

Primary Examiner—Jack M. Choules
(74) Attorney, Agent, or Firm—Banner & Witcoff, Ltd.

(57) ABSTRACT

A method of determining at least one match item corresponding to a source item. A database of multiple items such as songs is created. Each song is also represented by an n-dimensional database vector in which each element corresponding to one of n musical characteristics of the song. An n-dimensional source song vector that corresponds to the musical characteristics of a source song is determined. A Distance between the source song vector and each of database song vector is calculated, each distance being a function of the differences between the n musical characteristics of the source song vector and one of source database song vector. The calculation of the distances may include the application of a weighted factor to the musical characteristics of resulting vector. A match song is selected based on the magnitude of the distance between the source song and each database songs after applying any weighted factors.

21 Claims, 4 Drawing Sheets

U.S. PATENT DOCUMENTS

| | | | | |
|---|---|---|---|---|
| 5,726,909 A | 3/1998 | Krikorian | | 700/95 |
| 5,749,081 A | 5/1998 | Whiteis | | 707/102 |
| 5,754,938 A | 5/1998 | Herz et al. | | 725/116 |
| 5,758,257 A | 5/1998 | Herz et al. | | 725/116 |
| 5,809,246 A | 9/1998 | Goldman | | 709/217 |
| 5,822,744 A | 10/1998 | Kesel | | 706/56 |
| 5,835,087 A | 11/1998 | Herz et al. | | 215/810 |
| 5,848,396 A | 12/1998 | Gerace | | 705/10 |
| 5,848,404 A | 12/1998 | Hafner et al. | | 707/3 |
| 5,864,868 A | 1/1999 | Contois | | 707/104.1 |
| 5,893,095 A | 4/1999 | Jain et al. | | 707/6 |
| 5,897,639 A | 4/1999 | Greef et al. | | 707/103 R |
| 5,911,131 A | 6/1999 | Vig | | 705/1 |
| 5,913,204 A | 6/1999 | Kelly | | 705/500 |
| 5,918,223 A | 6/1999 | Blum et al. | | 707/1 |
| 5,931,901 A | 8/1999 | Wolfe et al. | | 709/206 |
| 5,945,988 A | 8/1999 | Williams et al. | | 715/747 |
| 5,963,916 A | 10/1999 | Kaplan | | 705/26 |
| 5,963,957 A | 10/1999 | Hoffberg | | 707/104.1 |
| 5,969,283 A | 10/1999 | Looney et al. | | 84/609 |
| 5,973,683 A | 10/1999 | Cragun et al. | | 715/719 |
| 6,020,883 A | 2/2000 | Herz et al. | | 715/721 |
| 6,026,388 A * | 2/2000 | Liddy et al. | | 707/5 |
| 6,026,398 A | 2/2000 | Brown et al. | | 707/5 |
| 6,029,195 A | 2/2000 | Herz | | 725/116 |
| 6,049,797 A | 4/2000 | Guha et al. | | 707/6 |
| 6,070,160 A | 5/2000 | Geary | | 707/4 |
| 6,085,185 A | 7/2000 | Matsuzawa et al. | | 707/2 |
| 6,088,722 A | 7/2000 | Herz et al. | | 709/217 |
| 6,240,423 B1 * | 5/2001 | Hirata | | 707/104.1 |
| 6,526,411 B1 * | 2/2003 | Ward | | 707/102 |
| 6,657,117 B1 * | 12/2003 | Weare et al. | | 84/668 |
| 2003/0089218 A1 * | 5/2003 | Gang et al. | | 84/615 |

OTHER PUBLICATIONS

Microsoft Press Computer Dictionaly Third Edition, 1997, PP. 492.*

Webster's II New Riverxide University dictionary, 1998, The Riverside Publishing Company, PP 1309.*

* cited by examiner

CONSUMER ITEM MATCHING METHOD AND SYSTEM

This application claims priority to provisional U.S. Application Ser. No. 60/291,821 filed May 16, 2001.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention is directed to the matching and selection of recommended consumer items from a database.

BACKGROUND OF THE INVENTION

Many consumers have difficulty finding items, such as music or videos, that they like, whether online, in a retail store or at home. For example, studies have shown that many consumers who enter music retail stores intending to buy, leave without making a purchase and that many of those unsatisfied consumers had fully intended to buy music on that visit. The online shopping experience, with its even larger selection, can be even more challenging to consumers. For example, to discover music, consumers must rely on rough genre classification tools or collaborative filtering technology. Neither is effective, as reflected in the purchasing patterns in the industry. In 2000, less than 3% of active music titles accounted for over 80% of sales Consumers lack an effective means of browsing and discovering new music they will like.

On the other side of matching equation, the would-be music transaction, music retailers, record labels, and other delivery channels strive to find the right listeners for the music they have to offer. No current means exist for the cost-effective promotion of extensive product lines to a wide audience. The economics of national promotion forces record labels to consolidate their marketing efforts and rely on "hits" to meet annual growth targets. Music consumers are not familiar with the vast majority of music releases, which, as a result, are not purchased and are unprofitable. The present invention is directed to novel methods and systems for retailers and content providers to better understand consumers and target music promotions.

BRIEF SUMMARY OF THE INVENTION

The invention is directed to a method and system for determining at least one match item that corresponds to a source item. For example, in the context of music, the invention includes the steps of creating a database comprising multiple songs, each song in the database represented by an n-dimensional database vector corresponding to n musical characteristics of the song; determining a n-dimensional source song vector that corresponds to n musical characteristics of the source song; calculating a first distance between the source song vector and a first database song vector, the distance being a function of the differences between the n musical characteristics of the source song vector and the first database song vector; calculating a second distance between the source song vector and a second database song vector, the distance being a function of the differences between the n musical characteristics of the source song vector and the second database song vector; and selecting the at least one match song based on the magnitude of the first distance and the second distance.

The invention may include numerous other features and characteristics, for example, again in the context of music, the steps of calculating the first and second distances may further include application of a weighting factor to the difference between certain of the n musical characteristics of the first and second database song vectors and the source song vector.

Other details of the invention are set forth in the following description.

DETAILED DESCRIPTION OF THE INVENTION

Figure 1:
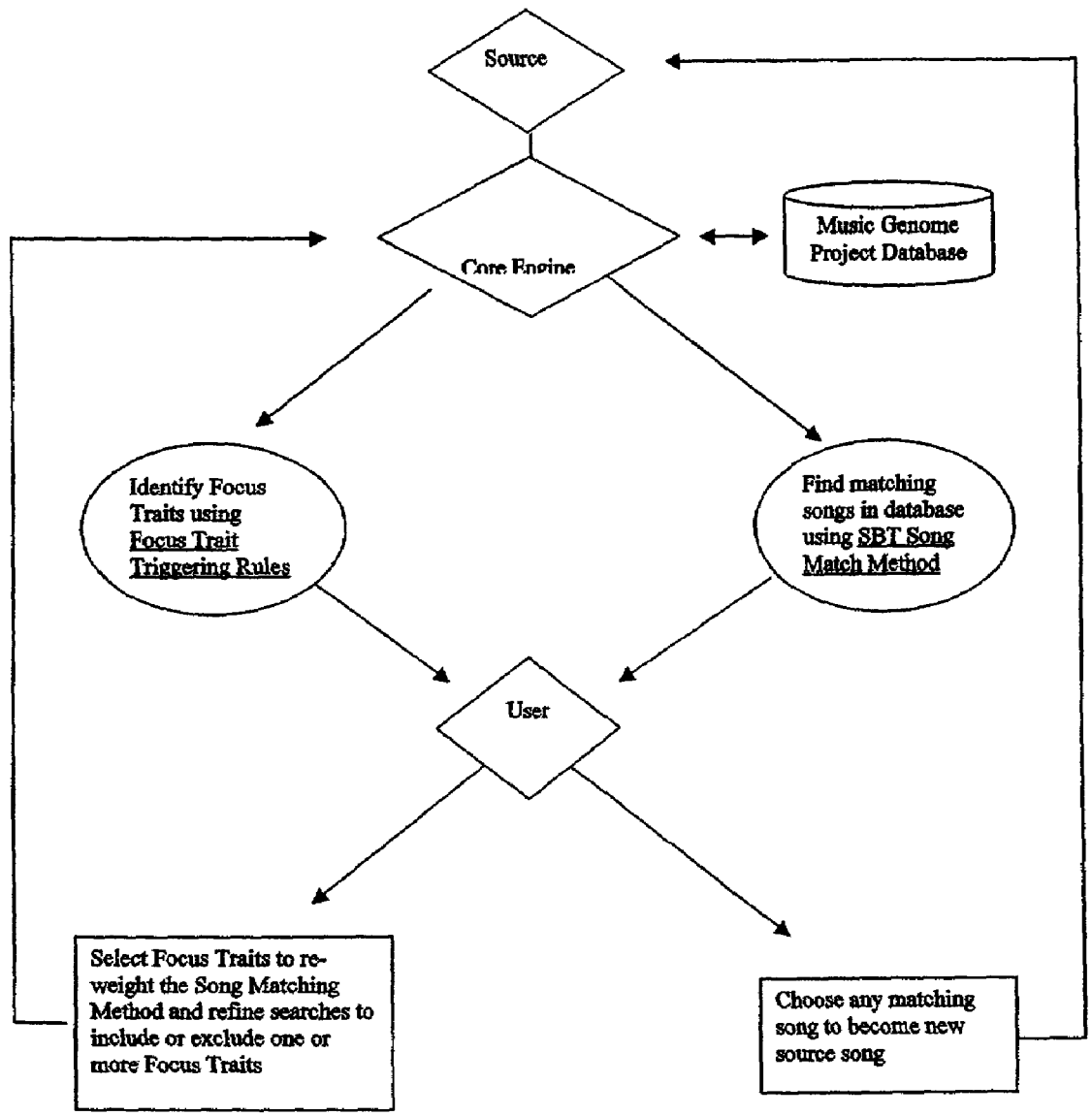
FIG. 1 shows a flow diagram overview of the invention.
Figure 2:
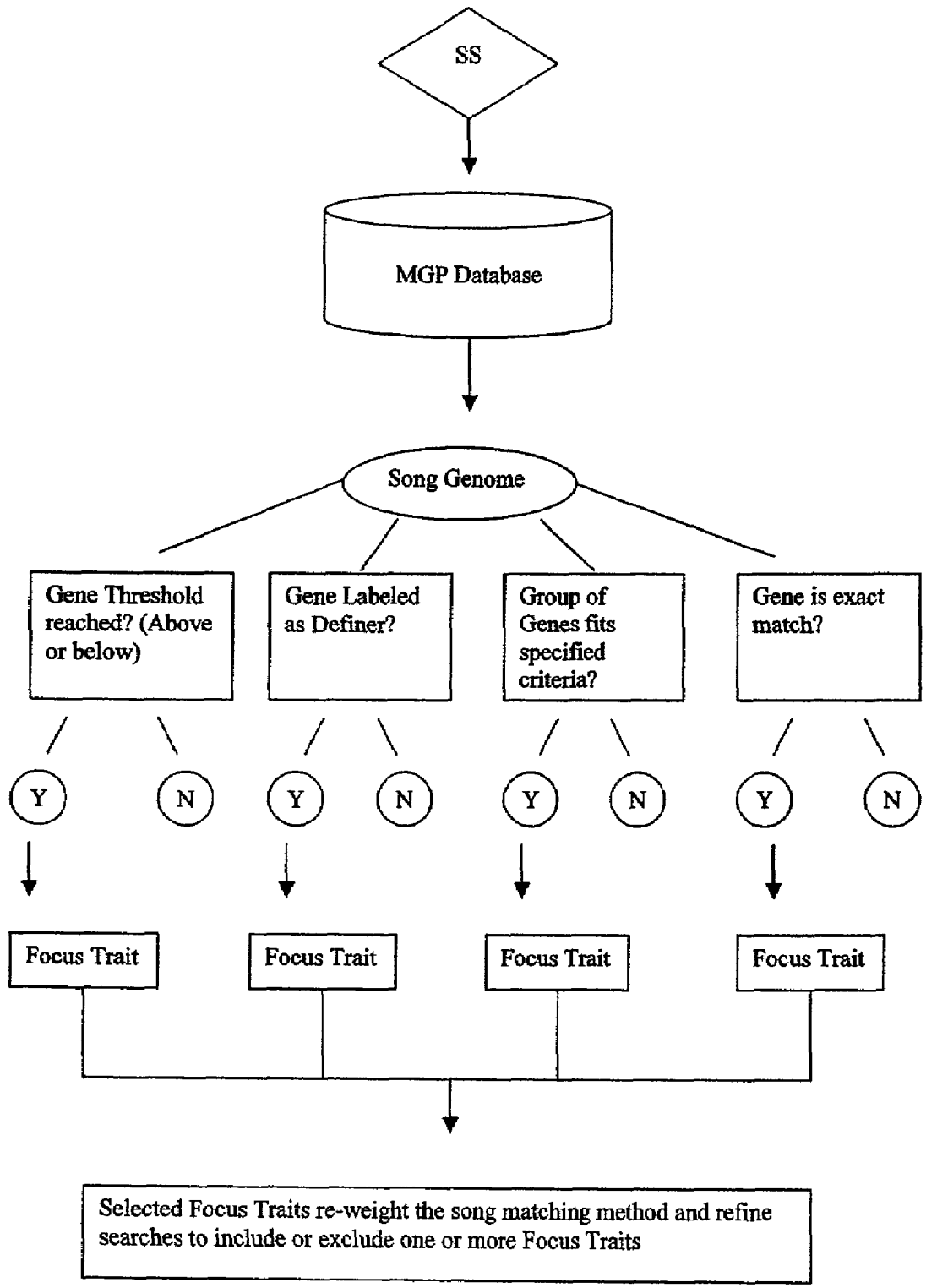
FIG. 2 shows a flow diagram of focus trait triggering rules employed in the invention.

The Music Genome Project™ is a database of songs. Each song is described by a set of multiple characteristics, or "genes", or more that are collected into logical groups called "chromosomes." The set of chromosomes make up the genome. One of these major groups in the genome is the Music Analysis Chromosome. This particular subset of the entire genome is sometimes referred to as "the genome."

Song Matching Techniques

Song to Song Matching

The Music Genome Project™ system is a large database of records, each describing a single piece of music, and an associated set of search and matching functions that operate on that database. The matching engine effectively calculates the distance between a source song and the other songs in the database and then sorts the results to yield an adjustable number of closest matches.

Each gene can be thought of as an orthogonal axis of a multi-dimensional space and each song as a point in that space. Songs that are geometrically close to one another are "good" musical matches. To maximize the effectiveness of the music matching engine, we maximize the effectiveness of this song distance calculation.

Song Vector

A given song "S" is represented by a vector containing approximately 150 genes. Each gene corresponds to a characteristic of the music, for example, gender of lead vocalist, level of distortion on the electric guitar, type of background vocals, etc. In a preferred embodiment, rock and pop songs have 150 genes, rap songs have 350, and jazz songs have approximately 400. Other genres of music, such as world and classical, have 300–500 genes. The system depends on a sufficient number of genes to render useful results. Each gene "s" of this vector is a number between 0 and 5. Fractional values are allowed but are limited to half integers.

Song $S=(s_1, s_2, s_3, \ldots, s_n)$

Basic Matching Engine

The simple distance between any two songs "S" and "T", in n-dimensional space, can be calculated as follows:

> distance=square-root of (the sum over all n elements of the genome of (the square of (the difference between the corresponding elements of the two songs)))

This can be written symbolically as:

> distance$(S,T)$=sqrt[(for $i$=1 to $n$)$\Sigma(s_i-t_i)\char`\^2$]

Because the monotonic square-root function is used in calculating all of these distances, computing the function is not necessary. Instead, the invention uses distance-squared in song comparisons. Accepting this and implying the subscript notation, the distance calculation is written in simplified form as:

> distance$(S,T)=\Sigma(s-t)\char`\^2$

B. Weighted and Focus Matching

1. Weighted Matching

Because not all of the genes are equally important in establishing a good match, the distance is better calculated as a sum that is weighted according to each gene's individual significance. Taking this into account, the revised distance can be calculated as follows:

> distance=$\Sigma[w^*(s-t)\char`\^2]=[w_1^*(s_1-t_1)\char`\^2]+[w_2^*(s_2-t_2)\char`\^2]+\ldots$ where the weighting vector "W,"

> Song $W=(w_1, w_2, w_3, \ldots, w_n)$ is initially established through empirical work done, for example, by a music team that analyzes songs. The weighting vector can be manipulated in various ways that affect the overall behavior of the matching engine. This will be discussed in more detail in the Focus Matching section of this document.

Scaling Functions

The data represented by many of the individual genes is not linear. In other words, the distance between the values of 1 and 2 is not necessarily the same as the distance between the values of 4 and 5. The introduction of scaling functions $f(x)$ may adjust for this non-linearity. Adding these scaling functions changes the matching function to read:

> distance=$\Sigma[w^*(f(s)-f(t))\char`\^2]$

There are a virtually limitless number of scaling functions that can be applied to the gene values to achieve the desired result.

Alternatively, one can generalize the difference-squared function to any function that operates of the absolute difference of two gene values. The general distance function is:

> distance=$\Sigma[w^*g(|s-t|)]$

In the specific case, $g(x)$ is simply $x^2$, but it could become $x^3$ for example if it was preferable to prioritize songs with many small differences over ones with a few large ones.

2. Focus Matching

Focus matching allows the end user of a system equipped with a matching engine to control the matching behavior of the system. Focus traits may be used to re-weight the song matching system and refine searches for matching songs to include or exclude the selected focus traits.

Focus Trait Presentation

Focus Traits are the distinguishing aspects of a song. When an end user enters a source song into the system, its genome is examined to determine which focus traits have been determined by music analysts to be present in the music. Triggering rules are applied to each of the possible focus traits to discover which apply to the song in question. These rules may trigger a focus trait when a given gene rises above a certain threshold, when a given gene is marked as a definer, or when a group of genes fits a specified set of criteria. The identified focus traits (or a subset) are presented on-screen to the user. This tells the user what elements of the selected song are significant.

Focus Trait Matching

An end user can choose to focus a match around any of the presented traits. When a trait, or number of traits, is selected, the matching engine modifies its weighting vector to more tightly match the selection. This is done by increasing the weights of the genes that are specific to the Focus Trait selected and by changing the values of specific genes that are relevant to the Trait. The resulting songs will closely resemble the source song in the trait(s) selected.

Personalization

The weighting vector can also be manipulated for each end user of the system. By raising the weights of genes that are important to the individual and reducing the weights of those that are not, the matching process can be made to improve with each use.

Aggregation

Song to Song Matching

The matching engine is capable of matching songs. That is, given a source song, it can find the set of songs that closely match it by calculating the distances to all known songs and then returning the nearest few. The distance between any two songs is calculated as the weighted Pythagorean sum of the squares of the differences between the corresponding genes of the songs.

Basic Multi-Song Matching

It may also be desirable to build functionality that will return the best matches to a group of source songs. Finding matches to a group of source songs is useful in a number of areas as this group can represent a number of different desirable searches. The source group could represent the collected works of a single artist, the songs on a given CD, the songs that a given end user likes, or analyzed songs that are known to be similar to an unanalyzed song of interest. Depending on the makeup of the group of songs, the match result has a different meaning to the end user but the underlying calculation should be the same.

This functionality provides a list of songs that are similar to the repertoire of an artist or CD. Finally, it will allow us to generate recommendations for an end user, purely on taste, without the need for a starting song.

Figure 3:
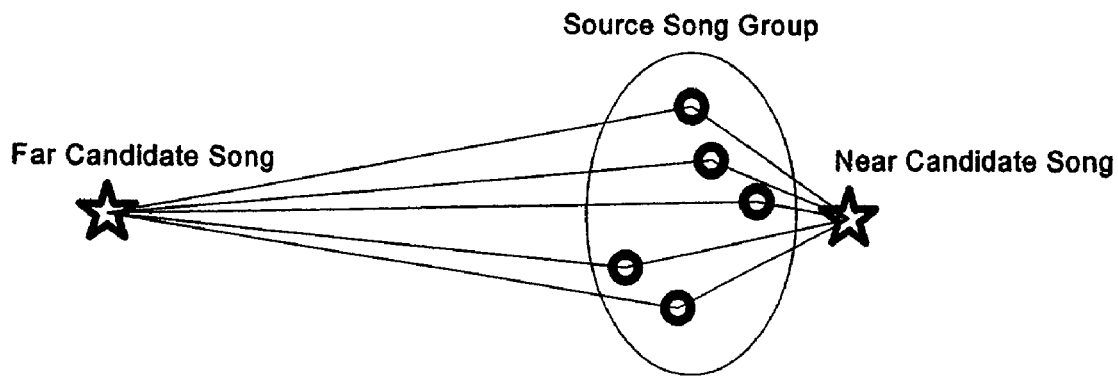
FIG. 3 depicts a relationship between different song candidates

FIG. 3 illustrates two songs. In this Figure, the song on the right is a better match to the set of source songs in the center.

Vector Pairs

Figure 4:
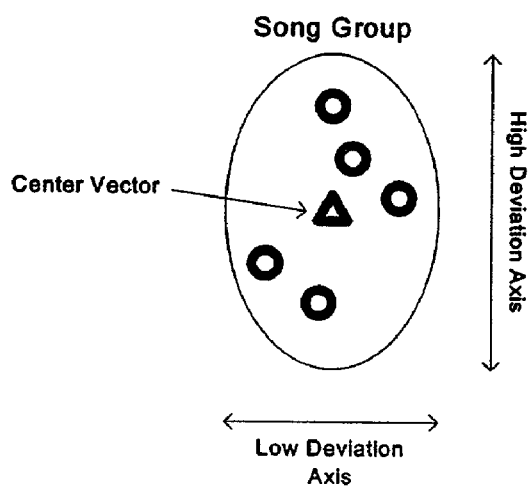
FIG. 4 is a graph showing a deviation vector.

Referring to FIG. 4, one way to implement the required calculation is to group the songs into a single virtual song that can represent the set of songs in calculations. The virtual "center" is defined to be a song vector who's genes are the arithmetic average of the songs in the original set. Associated with this center vector is a "deviation" vector that represents the distribution of the songs within the set. An individual gene that has a very narrow distribution of values around the average will have a strong affinity for the center value. A gene with a wide distribution, on the other hand, will have a weak affinity for the center value. The deviation vector will be used to modify the weighing vector used in song-to-song distance calculations. A small deviation around the center means a higher net weighting value.

The center-deviation vector pair can be used in place of the full set of songs for the purpose of calculating distances to other objects.

Raw Multi-Song Matching Calculation

If the assumption is made that a songs gene's are normally distributed and that they are of equal importance, the problem is straightforward. First a center vector is calculated and a standard deviation vector is calculated for the set of source songs. Then the standard song matching method is applied, but using the center vector in place of the source song and the inverse of the square of the standard deviation vector elements as the weights:

Target song vectors $T=(t_1, t_2 \ldots t_n)$
Center vector of the source group $C=(\mu_1, \mu_2, \ldots \mu_n)$
Standard deviation vector of the source group $D=(\sigma_1, \sigma_2, \ldots \sigma_n)$ $$distance_i = \Sigma[(1/\sigma_i)^{\wedge}2 *(\mu_i - t_i)^{\wedge}2]$$

As is the case with simple song-to-song matching, the songs that are the smallest distances away are the best matches.

Using Multi-Song Matching With the Weighting Vector

The weighting vector that has been used in song-to-song matching must be incorporated into this system alongside the $1/\sigma^{\wedge}2$ terms. Assuming that they are multiplied together so that the new weight vector elements are simply:

New weight=$w_i/\sigma_i^{\wedge}2$

A problem that arises with this formula is that when $\sigma^2$ is zero the new weight becomes infinitely large. Because there is some noise in the rated gene values, $\sigma^2$ can be thought of as never truly being equal to zero. For this reason a minimum value is added to it in order to take this variation into account. The revised distance function becomes:

$$distance_i = \Sigma[(w_i * 0.25/(\sigma_i^{\wedge}2 + 0.25))*(\mu_i - t_i)^{\wedge}2]$$

Other weighting vectors may be appropriate for multi-song matching of this sort. Different multi-song weighting vector may be established, or the $(0.5)^2$ constant may be modified to fit with empirically observed matching results.

Taste Portraits

Groups with a coherent, consistent set of tracks will have both a known center vector and a tightly defined deviation vector. This simple vector pair scheme will breakdown, however, when there are several centers of musical style within the collection. In this case we need to describe the set of songs as a set of two or more vector pairs.

Figure 5:
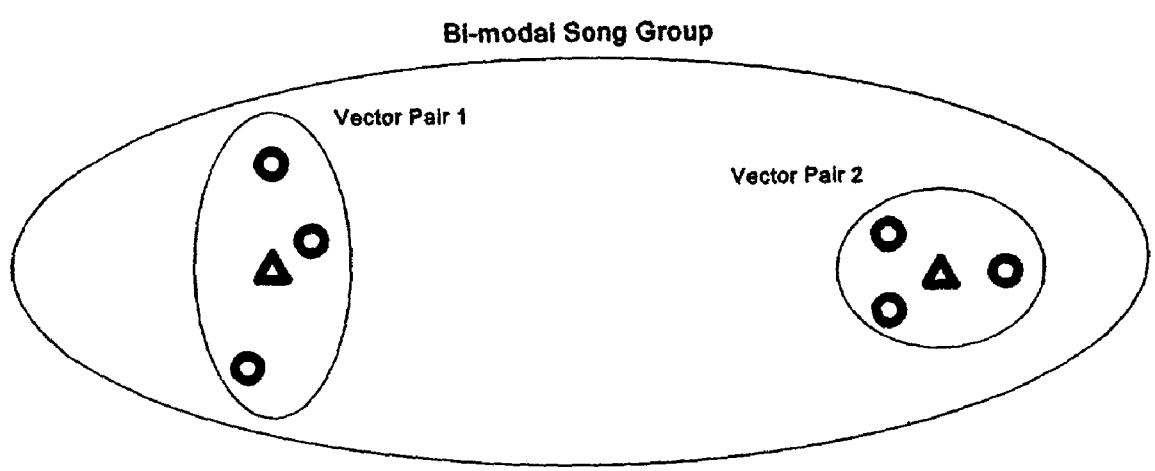
FIG. 5 graphically depicts a bimodal song group.

As shown in FIG. 5, the song group can be described with two vector pairs. By matching songs to one OR the other of the vector pairs, we will be able to locate songs that fit well with the set. If we were to try to force all of the songs to be described by a single pair, we would return songs in the center of the large ellipse that would not be well matched to either cluster of songs.

Ideally there will be a small number of such clusters, each with a large number of closely packed elements. We can then choose to match to a single cluster at a time. In applications where we are permitted several matching results, we can choose to return a few from each cluster according to cluster size.

The invention has been described with respect to specific examples including presently preferred modes of carrying out the invention. Those skilled in the art will appreciate that there are numerous variations and permutations of the above described systems and techniques, for example, that would be used with videos, wine, films, books and video games, that fall within the spirit and scope of the invention as set forth in the appended claims.

We claim:

1. A computer implemented method of determining at least one match song that corresponds to a source song, comprising the steps:
    creating a database comprising multiple songs, each song in the database represented by an n-dimensional database vector corresponding to n musical characteristics of the song;
    determining a n-dimensional source song vector that corresponds to n musical characteristics of the source song;
    calculating a first distance between the source song vector and a first database song vector, the distance being a function of the differences between the n musical characteristics of the source song vector and the first database song vector, wherein the step of calculating the first distance includes application of a weighting factor;
    calculating a second distance between the source song vector and a second database song vector, the distance being a function of the differences between the n musical characteristics of the source song vector and the second database song vector;
    selecting the at least one match song based on the magnitude of the first distance and the second distance.

2. A method as in claim 1 wherein the steps of calculating the second distances further includes application of a weighting factor to the difference between certain of the n musical characteristics of the second database song vectors and the source song vector.

3. A method as in claim 1 wherein a scaling factor is applied to a musical characteristic n of the source song vector before calculating a first or a second distance.

4. A method as in claim 3 wherein a scaling factor is applied to a musical characteristic n of the first database song vector before calculating a first or a second distance.

5. A method as in claim 1 further comprising, in addition to calculating the first distance and the second distance:
    calculating a third distance between the source song vector and a third database song vector, the distance being a function of the difference between the n musical characteristics of the source song vector and the third database vector;
    selecting the at least one match song based on the magnitude of the first distance, the second distance and the third distance.

6. A method as in claim 1 wherein a plurality of songs in the song database are ranked based on the calculated distances.

7. A method as in claim 1 wherein n is at least 100.

8. A method as in claim 2 wherein the certain n musical characteristics are predefined at the time of creation of the database.

9. A computer implemented method as in claim 1 wherein the steps of calculating the second distances further includes application of a weighting factor to the difference between certain of the n characteristics of the second database item vectors and the source item vector.

10. A computer implemented method of choosing a recommended song from a database that corresponds to a source song designated by a user comprising the steps of:
- identifying a group of characteristics that correspond to the source song;
- selecting one or more characteristics from the group;
- generating weighting values based on the characteristics;
- assigning the weighting values to characteristics of the source song;
- comparing the weighted characteristics of the source song and characteristics of the songs in the predetermined database; and
- selecting a recommended song based on the comparison.

11. A method as in claim 10 wherein the step of identifying a group of characteristics comprises evaluating at least 100 musical qualities of the song.

12. A method as in claim 10 wherein the step of selecting the characteristics comprises receiving user preference input.

13. A computer implemented method for selecting songs for a user comprising the steps of:
- user-selecting a group of songs from a database, each song including multiple characteristics and a numerical value corresponding to each characteristic;
- calculating a vector pair corresponding to the group, comprising the steps of:
  - calculating a first vector from averages of the numerical values of the song characteristics of the songs in the group;
    - calculating a second vector based on a calculation of the deviation of the numerical values of the song characteristics of the songs in the group;
- selecting additional songs from the database based on a relationship of the vector pair and numerical characteristics of other songs in the database.

14. A method as in claim 13 wherein the step of calculating the vector pair further includes application of a weighting factor to some of the numerical values of the song characteristics.

15. A method as in claim 14 wherein the weighting factor is selected by the user.

16. A method as in claim 15 wherein the database contains songs analyzed and assigned numerical values corresponding to characteristics by a listener.

17. A computer implemented method for generating recommended items for a user comprising the steps of:
- collecting selection data regarding user preference for particular items;
- grouping the items into preference clusters;
- calculating a vector pair for each of the preference clusters comprising the steps of:
  - calculating a first vector relating to averages of numerical values corresponding to characteristics of each of the items in the preference cluster;
  - calculating a second vector corresponding to the deviation of the numerical values of the characteristics;
- selecting items from a database based on a relationship of the vector pair and characteristics of other items in the database.

18. A method as in claim 17 wherein the item is selected from the group consisting of music, videos, wine, films, books and video games.

19. An apparatus comprising:
- a processor; and
- a memory for storing computer readable instructions that, when executed by the processor, cause the computer to perform the steps of:
  - receiving user input corresponding to an item preferred by a user;
  - determining a n-dimensional source item vector that corresponds to n characteristics of the source item;
  - accessing a database comprising information about multiple items, each item in the database represented by an n-dimensional database vector corresponding to n characteristics of the item;
  - calculating a first distance between the source item vector and a first database item vector, the distance being a function of the differences between the n characteristics of the source item vector and the first database item vector, wherein the step of
  - calculating the first distance includes application of a weighting factor;
  - calculating a second distance between the source item vector and a second database item vector, the distance being a function of the differences between the n characteristics of the source item vector and the second database item vector;
  - selecting a recommended item based on the magnitude of the first distance and the second distance;
  - outputting data to the user regarding the recommended item.

20. An apparatus as in claim 19 wherein the item is from the group consisting of music, videos, video games and wine.

21. A computer implemented method of dynamically determining focus trait characteristics of a source song comprising the steps of:
- generating an underlying database of ratings of musical characteristics of the source song;
- presenting the musical characteristics to a user;
- using the user's selection of the musical characteristics of the source song to choose a weighting vector for use in subsequent matching.

* * * * *